United States Patent
Wang et al.

(10) Patent No.: US 9,471,372 B2
(45) Date of Patent: Oct. 18, 2016

(54) METHOD AND DEVICE FOR SCHEDULING COMMUNICATION SCHEDULABLE UNIT

(71) Applicant: Telefonaktiebolaget L M Ericsson (publ), Stockholm (SE)

(72) Inventors: Jun Wang, Nanjing (CN); Begood Chen, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/778,033

(22) PCT Filed: Mar. 21, 2013

(86) PCT No.: PCT/CN2013/073003
§ 371 (c)(1),
(2) Date: Sep. 17, 2015

(87) PCT Pub. No.: WO2014/146279
PCT Pub. Date: Sep. 25, 2014

(65) Prior Publication Data
US 2016/0179571 A1 Jun. 23, 2016

(51) Int. Cl.
*G06F 9/54* (2006.01)
*G06F 9/48* (2006.01)
*H04W 72/12* (2009.01)

(52) U.S. Cl.
CPC ........... *G06F 9/4818* (2013.01); *G06F 9/4881* (2013.01); *G06F 9/4887* (2013.01); *H04W 72/1215* (2013.01)

(58) Field of Classification Search
CPC .. G06F 9/4818; G06F 9/4887; G06F 9/4881; H04W 72/1215
See application file for complete search history.

(56) References Cited

U.S. PATENT DOCUMENTS

| 7,941,645 | B1 | 5/2011 | Riach et al. |
| 2004/0128654 | A1 | 7/2004 | Dichter |

(Continued)

FOREIGN PATENT DOCUMENTS

| CN | 1949913 A | 4/2007 |
| CN | 101400137 A | 4/2009 |
| CN | 102902587 A | 1/2013 |
| WO | WO 2009/099573 A1 | 8/2009 |

OTHER PUBLICATIONS

International Search Report and Written Opinion of the International Searching Authority, Application No. PCT/CN2013/073003, Dec. 12, 2013.

(Continued)

*Primary Examiner* — Syed Roni
(74) *Attorney, Agent, or Firm* — Myers Bigel & Sibley, P.A.

(57) ABSTRACT

Communication schedulable units (CSUs) belonging to different owners in a radio communication device are scheduled to use multiple processors. The CSUs under different owners can be processed in parallel by the different processors. A global CSU list and an owner waiting list are maintained. The global CSU list may include the CSUs waiting to be processed and the CSUs are ordered according to the time stamps of the CSUs. The owner waiting list may include the owners that have no CSU being processed and the owners are ordered according to the time stamps of their respective earliest CSUs waiting to be processed in the global CSU list. When one of the processors finishes processing a first CSU of a first owner, a CSU to be processed next is scheduled according to the CSU time order and the CSU affinity, based on the global CSU list and the owner waiting list.

23 Claims, 10 Drawing Sheets

(56) References Cited

U.S. PATENT DOCUMENTS

| | | |
|---|---|---|
| 2005/0071438 A1 | 3/2005 | Liao et al. |
| 2007/0086341 A1 | 4/2007 | Ye |
| 2008/0250233 A1 | 10/2008 | Marden et al. |
| 2009/0010202 A1* | 1/2009 | Masayuki ............ H04L 5/0007 370/328 |
| 2009/0160863 A1 | 6/2009 | Frank |
| 2012/0094680 A1 | 4/2012 | Stackelius et al. |

OTHER PUBLICATIONS

Communication with Supplementary European Search Report, EP Application No. 13878618.1, Feb. 9, 2016, 10 pages.

Chen et al., "Optimized Out-of-Order Parallel Discrete Event Simulation Using Predictions", IEEE Design, Automation & Test in Europe Conference & Exhibition, Mar. 18, 2013, pp. 3-8.

* cited by examiner

METHOD AND DEVICE FOR SCHEDULING COMMUNICATION SCHEDULABLE UNIT

CROSS REFERENCE TO RELATED APPLICATION

This application is a 35 U.S.C.§371 national stage application of PCT International Application No. PCT/CN2013/073003, filed on Mar. 21, 2013, the disclosure and content of which is incorporated by reference herein in its entirety. The above-referenced PCT International Application was published in the English language as International Publication No. WO 2014/146279 A1 on Sep. 25, 2014.

TECHNICAL FIELD

The present technology relates to a method of scheduling communication schedulable units belonging to different owners in a radio communication device using multiple processors. The technology also relates to a radio communication device, a computer program product, a computer program and a recording storage medium.

BACKGROUND

Nowadays, the radio communication devices such as base stations are increasingly employing the dual or even multiple processors so as to improve the processing efficiency, in which the signal processing is usually performed through spawning multiple communication schedulable units (CSUs) running in parallel to achieve high performance. However, unlike the common parallel processing environment for example in the traditional desktop Operation System (OS), there are still several challenges in the radio communication environment which need be carefully handled:

1. Synchronization between CSUs

Generally, in order that the CSUs of the same owner can access the same data source simultaneously, the semaphore mechanism will be involved to guarantee the data integrity by reinforcing the multiple CSUs serial execution. However, it may cause unnecessary CSU context switch. So in radio communication environment it needs to consider another mechanism to guarantee the synchronization between CSUs.

2. Controlling of the processor resources consumption

In the radio communication environment, it usually adopts non-preemption scheduling to avoid unnecessary context switch, which however introduces a side effect that once a processor is occupied by a low priority CSU, the processor can not be released unless the low priority CSU aborts the processor by itself. Thus it is needed to limit the processor usages to avoid the excessive consumption by those low priority CSUs.

3. Affinity among the CSUs

The normal CSU scheduling criteria can be based on the priority or time stamp of the CSUs. However, the affinity among the CSUs is also a factor to be considered due to overhead of code and data cache missing. Generally, the affinity means a kind of bundling relationship between an executive unit (e.g. CSU) and a processor for some purposes. For example, the executive units may access the same data context and be intended to be processed by the same processor. In this way, when the processor successively processes the executive units with affinity, such data context stored in the cache can be reused without involving switching of code in the cache. If a CSU has affinity with currently executing CSU, for example this CSU and the currently executing CSU belong to the same owner, and accordingly they may access the same data context, then although this CSU is created later than another earlier CSU of other owners waiting to be processed, it can be scheduled prior to the earlier one as long as the CSU is close enough to the current executing CSU on creation time stamp (e.g. the time interval is smaller than a threshold), since the affinity may alleviate the overhead of code and data cache missing.

Currently, there are two known CSU scheduling solutions in the radio communication environment: CSU-based solution and owner-based solution.

As illustrated in FIG. 1, the CSU-based solution queues all the ready CSUs in a waiting list. Once a processor is available, it can fetch the first CSU for execution. However, as mentioned before, the CSU at list head (beginning of the list) may not be allowed to run due to synchronization if another CSU under the same owner is running. So it needs to go through the list from head to check subsequent CSUs one by one until the first CSU of an idle owner is found. Then the CSU is unlinked from the list and executed on the processor. Next time when another processor is idle, the above browse procedure is repeated again from the head. In other word, the CSU scheduling involves a linear search on the waiting list, which causes the searching time complexity of O(N) indicating a linear running time, which is low efficiency in the radio communication environment that has higher requirement in terms of the real-time. Furthermore, since the CSU-based solution adopts linear search along the list to find an appropriate CSU to schedule, to avoid too much searching overhead, it stops once an appropriate CSU is met and does not go further in the list. In such a way, only the time order of the CSUs is considered while the affinity among the CSUs is neglected, which may cause frequent switching of code in the cache if a CSU under a different owner is dispatched.

By contrast, the owner-based solution, as illustrated in FIG. 2, always successively schedules the CSUs under a single owner for a processor, and the CSUs under other owners will not be scheduled until all the CSUs under the single owner have been processed. As indicated, the owner-based solution does not involve the linear search in the CSU scheduling, however it can only see the CSUs under the same owner without global view of CSUs under different owners. In other words, contrary to the CSU-base solution, it only considers the affinity among the CSUs while neglecting the time order of the CSUs. So it always finishes all CSUs under one owner before considering the CSUs under others, which may cause unbalanced resources consumption among owners. Extremely, if a running owner always has incoming CSUs, the CSUs of other owners can't be scheduled.

In addition, actually some CSUs under the same owner may also be independent of each other, since they access the different parts of same data context. They still can be dispatched on multiple processors to run in parallel. In this case, those independent CSUs need to be grouped to different "sub-owners". However both of the current solutions inhibit such mode and enforce that all the CSUs under the same owner must be run in serial due to the impossibility of data orthogonal division among multiple "sub-owners". There are "always" some CSUs stepping into other sub-owners' zone, in other words, the CSU under one owner may access the part of data context used by the other owners, thereby block the CSU execution in other, even all, sub-owners.

SUMMARY

An aspect of an invention disclosed herein is a method of scheduling CSUs belonging to different owners in a radio communication device. The CSUs under different owners can be processed in parallel by the different processors. The method comprises: maintaining a global CSU list and an owner waiting list; the global CSU list may include the CSUs waiting to be processed and the CSUs are ordered according to the time stamps of the CSUs; the owner waiting list may include the owners that have no CSU being processed by the processors and the owners are ordered according to the time stamps of their respective earliest CSUs waiting to be processed in the global CSU list. And when one of the processors finishes processing a first CSU of a first owner, scheduling a CSU to be processed next by the processor according to the CSU time order and the CSU affinity, based on the global CSU list and the owner waiting list.

Another aspect of the invention is a radio communication device having multiple processors and being adapted for scheduling CSUs belonging to different owners. The CSUs under different owners can be processed in parallel by the different processors. The radio communication device may comprise a first maintaining unit and a scheduling unit. The first maintaining unit is adapted to maintain a global CSU list and an owner waiting list; the global CSU list may include the CSUs waiting to be processed and the CSUs are ordered according to the time stamps of the CSUs; the owner waiting list may include the owners that have no CSU being processed by the processors and the owners are ordered according to the time stamps of their respective earliest CSUs waiting to be processed in the global CSU list. The scheduling unit is adapted to schedule a CSU to be processed next by a processor that has not CSU being processed according to the CSU time order and the CSU affinity, based on the global CSU list and the owner waiting list, when the processor finishes processing a first CSU of a first owner.

A further aspect of the invention is a computer program product comprising the instructions which, when running on a radio communication device provided with multiple processors, causes the radio communication device to perform the steps of the method as described above.

Still a further aspect of the invention is a computer readable storage medium storing the instructions which, when running on a radio communication device provided with multiple processors, cause the radio communication device to perform the steps of the method as described above.

Through introducing the global CSU list and owner waiting list, the embodiments creatively take both the CSU time order and the CSU affinity into account in the CSU scheduling used by the radio communication device. In this way, the CSUs can be scheduled more reasonably by taking both the CSU time order and CSU affinity into account. In addition, the embodiments may not require the linear search in each CSU scheduling.

BRIEF DESCRIPTION OF THE DRAWINGS

The technology will now be described, by way of example, based on embodiments with reference to the accompanying drawings, wherein:

FIG. 3 schematically illustrates a flowchart of scheduling CSUs in a radio communication device using multiple processors in accordance with an embodiment;

DETAILED DESCRIPTION

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Figure 14:
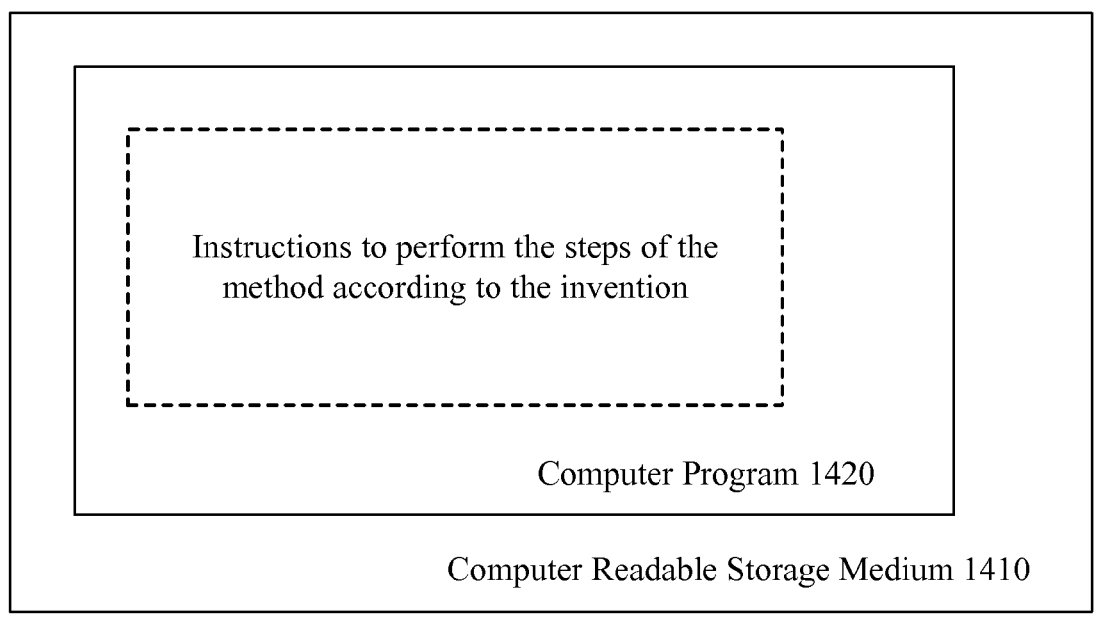
FIG. 14 schematically illustrates a computer readable storage medium and a computer program used for scheduling CSUs in a radio communication device using multiple processors in accordance with an embodiment.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system, as illustrated in FIG. 14. In the context of this document, a computer-usable or computer-readable storage medium may be any medium that may contain, store, or is adapted to communicate the program for use by or in connection with the instruction execution system, apparatus, or device.

Embodiments herein will be described below with reference to the drawings.

FIG. 3 schematically illustrates a flowchart of scheduling CSUs in a radio communication device using multiple processors (or cores) in accordance with an embodiment. Generally, a radio communication device can be taken as a real-time processing system that is subject to a "real-time constraint", e.g. operational deadlines from event to system response. It must guarantee response within strict time constraints. Often real-time response times are understood to be in the order of milliseconds and sometimes microseconds.

Now the process of the embodiment will be described in detail with reference to the FIG. 3.

In the radio communication device such as base station, the CSUs may belong to different owners. The CSU represents various communication tasks to be processed by the radio communication device, such as assigning the signaling resources for the user equipments, establishing the calling session among the user equipments, handling the internal timer expiration, updating the routing information, and the like. The owner is an entity owning the CSUs that access the same part of data source (or context). For example, an owner can represent a User Equipment (UE), and it is also possible that a single UE can be represented by several owners logically. In this case, the CSUs under the same owner should be processed in serial to ensure the data integrity. In addition, the CSUs belonging to different owners may access the different parts of data source (or context), thus these CSUs can be processed in parallel by the different processors.

Firstly, the radio communication device may maintain (step 30) a global CSU list and an owner waiting list.

The global CSU list includes the CSUs waiting to be processed. In the global CSU list, the CSUs are ordered according to the time stamps of the CSUs. Generally, the timestamp is a sequence of characters or encoded information identifying when a certain event occurred, usually giving date and time of day, sometimes accurate to a small fraction of a second. Herein, the time stamp of the CSU may represent the time when the CSU is created or the time when the CSU joins in the global CSU list.

The owner waiting list includes the owners that have no CSU being processed by the processors. In other words, the owners that have one or more CSUs to be processed by the processors will be removed from the owner waiting list. In the owner waiting list, the owners are ordered according to the time stamps of their respective earliest CSUs (i.e. the CSU with the minimum time stamp) waiting to be processed in the global CSU list.

When a processor finishes processing a CSU under an owner, the radio communication device may schedule (step 40) a CSU to be processed next by the processor according to the CSU time order and the CSU affinity, based on the global CSU list and the owner waiting list.

The CSU time order can be determined by the time stamp of the CSU. For example, if the time stamp of the CSU A is earlier than the time stamp of the CSU B, then the CSU A is sorted prior to the CSU B in the global CSU list. The CSU affinity means that one CSU has affinity with a processor which already has cached the necessary code or data this CSU need. As mentioned above, the CSUs under the same owner may access the same part of context. In this case, if a processor just finish processing the CSU A, then in view of the CSU affinity, it is desirable for the processor to process another CSU B under the same owner as the previous CSU A, since the data context accessed by the CSU B has been stored in the cache memory due to processing the CSU A just now. In this way, it does not have to perform the data context switch. However, in the opposite situation, if the processor is to process another CSU C under the different owner from the CSU A, then it is needed to flush the data context used by the CSU A from the cache memory, and then read the data context used by the CSU C into the cache memory.

Figure 1:
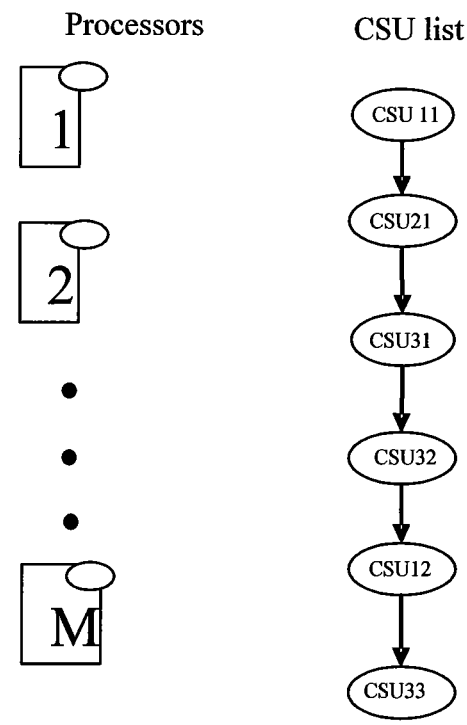
FIG. 1 schematically illustrates an example structure of a CSU-based solution used for CSU scheduling.
Figure 2:
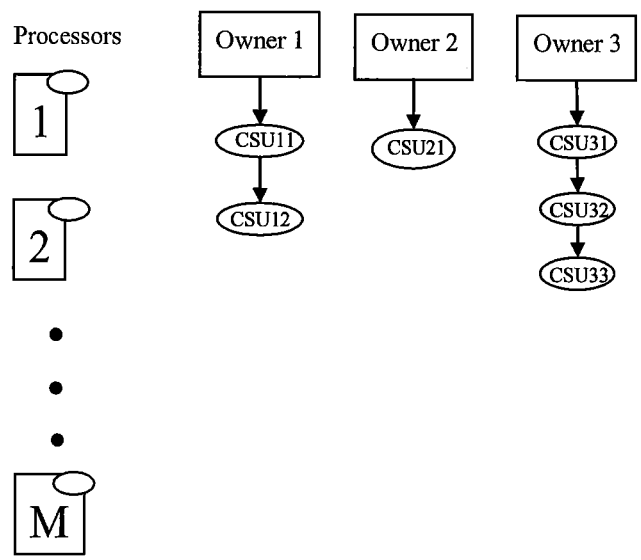
FIG. 2 schematically illustrates an example structure of owner-based solution used for CSU scheduling.
Figure 4:
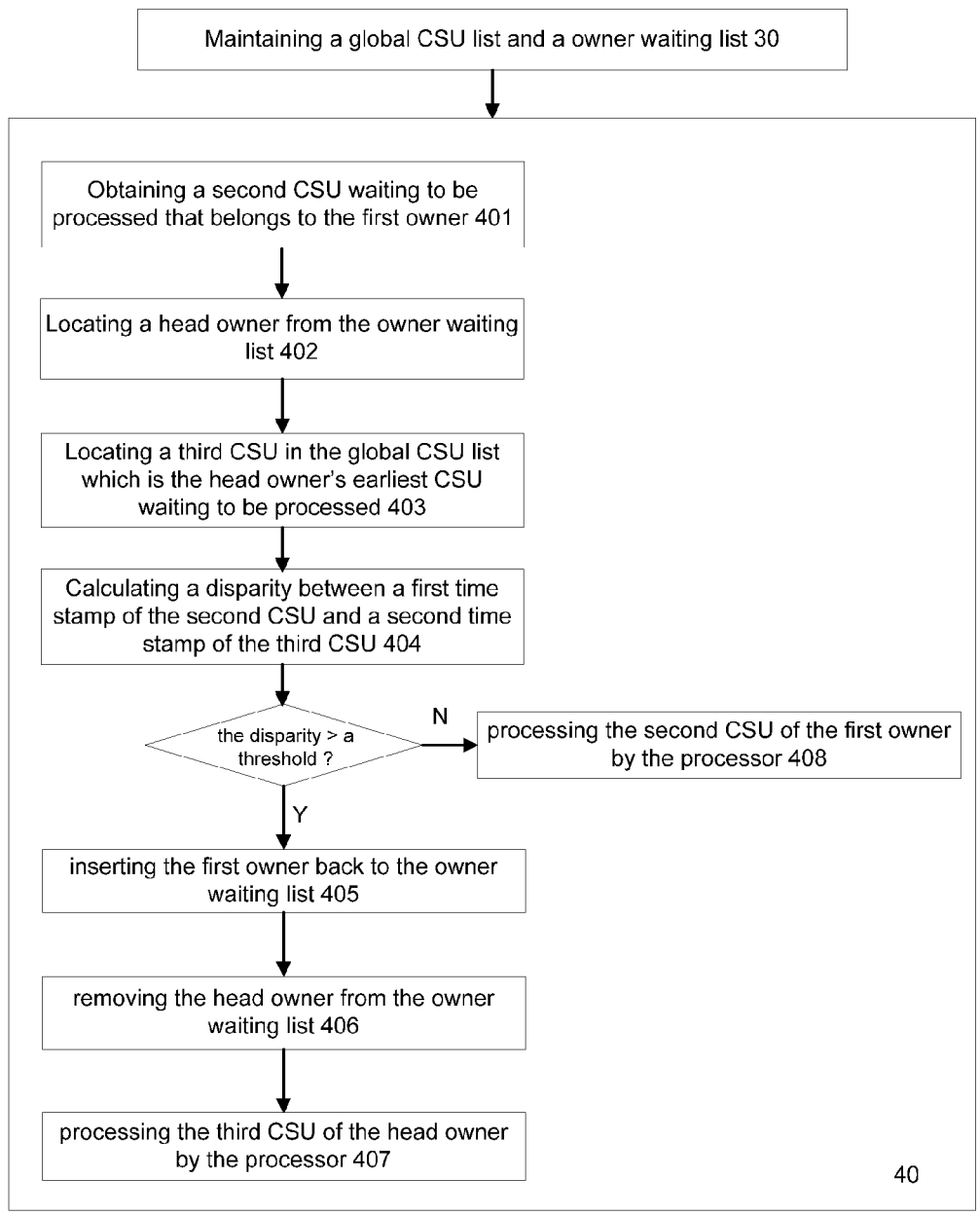
FIG. 4 schematically illustrates a flowchart of scheduling CSUs in a radio communication device using multiple processors in accordance with another embodiment.
Figure 8:
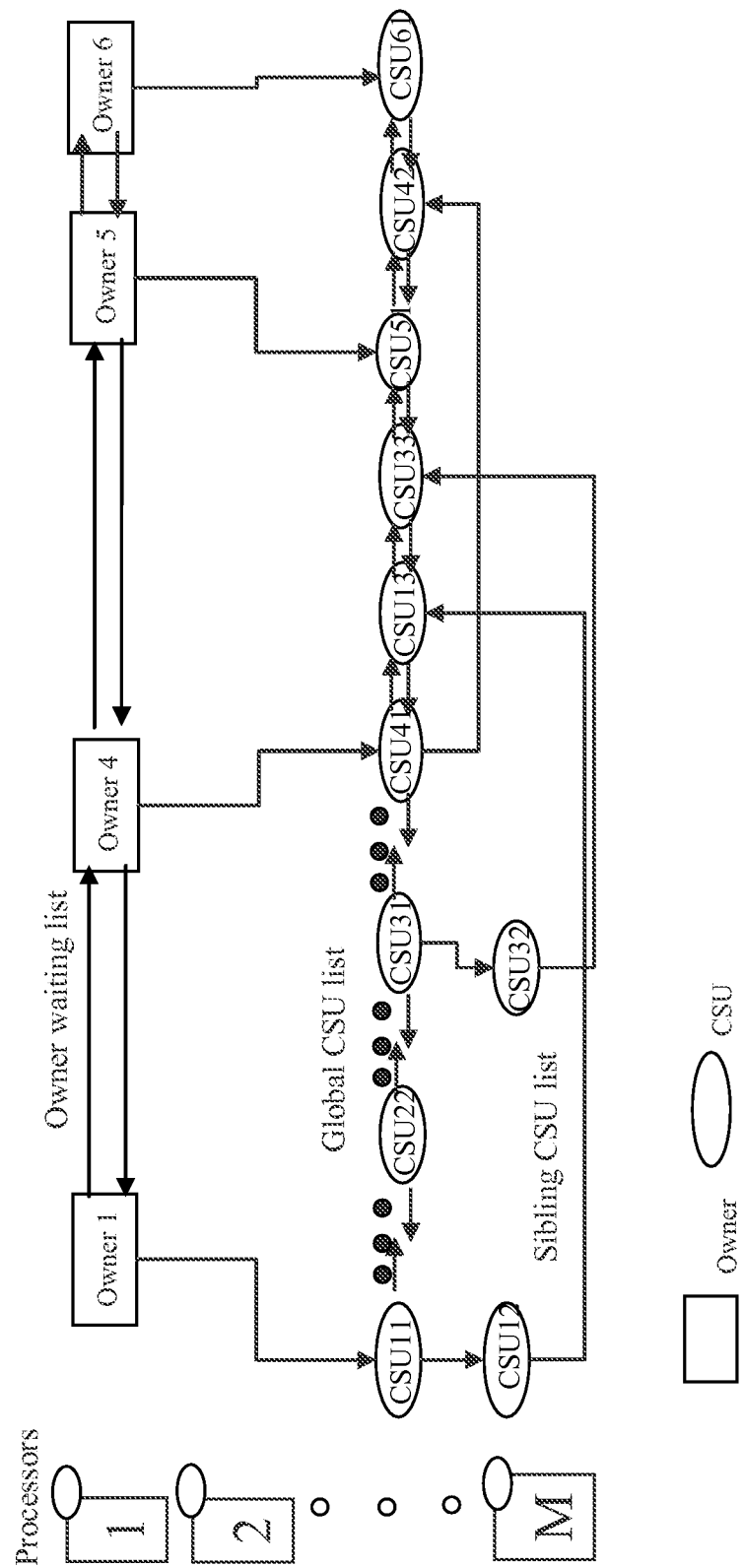
FIG. 8 schematically illustrates an example structure of a global CSU list and the owner waiting list in accordance with the embodiment.

Subsequently, an exemplary implementation will be described with reference to the FIG. 4 and FIG. 8.

In step 401, When a processor just finished processing a CSU under an owner, the radio communication device may try to obtain the another CSU has the minimum time stamp among the CSUs waiting to be processed that belong to this owner, i.e. the earliest CSU. In an embodiment, this owner may points to all its CSUs waiting to be processed. As such, the radio communication device may locate all the CSUs through this owner, and compare the time stamps among them to determine the CSU with the minimum time stamp. In another embodiment, a sibling CSU list is maintained to accommodate all the CSUs waiting to be processed under this owner, and this owner may refer to the head of the sibling CSU list. For example, as shown in FIG. 8, the owner 4 has CSU 41 and CSU 42. The two CSUs are linked together in a sibling CSU list and the owner 4 points to the head of the sibling list, i.e. the CSU 41. Preferably, the CSUs are listed in ascending order in the sibling CSU list according to their time stamp. In other words, the CSU with minimum time stamp will be the head of the sibling CSU list. In this way, the radio communication device will locate the head CSU in the sibling CSU list referred by this owner. As seen, this head CSU has affinity with the CSU just processed, since they belong to the same owner.

In step 402, the radio communication device may locate directly a head owner from the ordered owner waiting list. The head owner's earliest CSU waiting to be processed has the minimum time stamp among the owners in the owner waiting list. For example, as illustrated in FIG. 8, in the owner waiting list, there are four members, owner 1, owner 4, owner 5 and owner 6. And the four owners are listed in ascending order in the owner waiting list according to the time stamps their earliest CSUs waiting to be processed. That is, the owner having the minimum CSU time stamp will be listed in the head of the owner waiting list. Therefore, the radio communication device may directly locate this head owner, e.g. CSU 11, in the owner waiting list.

In step 403, the radio communication device may locate the earliest CSU waiting to be processed under the head owner located in step 402, in the global CSU list. Typically, the owners in the owner waiting list may refer to their earliest CSU in the global CSU list. For example, as shown in FIG. 8, the owner 1 refers to it earliest CSU in the global CSU list, CSU 11; the owner 4 refers to the CSU 41; the owner 5 refers to the CSU 51, and the like. In this way, the radio communication device may also directly locate the intended CSU in the global CSU list. As mentioned above, only the owner having no CSU being processed are listed in the owner wait list, in other words, the owners not being listed in the owner waiting list may have acquired the processor resources. Thus, the located head owner should be the owner with the highest priority to acquire the processor resources; accordingly, the located CSU in the step 403 should be the candidate CSU with the top time order to be processed.

In step 404, the radio communication device may compare the time stamp of the CSU with closest affinity (located in step 401) with the time stamp of the CSU with the top time order (located in step 403), and calculate the disparity between the two time stamps.

In step 405, if the time stamp of the CSU with closest affinity is later (or more) than the time stamp of the CSU with the top time order, and the disparity exceeds a predetermined threshold, i.e. time interval, then it means that the CSU with the top time order takes precedence of the CSU with closest affinity, thereby the owner having the CSU with closest affinity has to yield the processor, and the owner having the CSU with the top time order will acquire the processor. In this case, the radio communication device may take the following actions:

Firstly, the radio communication device may insert the owner aborting the processor back to the owner waiting list, and the owner's position in the owner waiting list can be determined by the time stamp of its earliest CSU being listed in the global CSU list. The detailed insertion implementation will be described later. Next, the radio communication device may remove the owner acquiring the processor from the owner waiting list. Finally, the CSU with the top time order will be processed by the processor.

On the other hand, if the time stamp of the CSU with closest affinity is earlier (or less) than the time stamp of the CSU with the top time order, or else the disparity is below the predetermined threshold, then it means that the CSU with closest affinity takes precedence of the CSU with the top time order. As such, the radio communication device may instruct the processor to proceed with the CSU with the closest affinity, i.e. the next sibling CSU of the CSU just processed.

In the embodiment, the predetermined threshold can be adjusted as desired. Actually if the threshold is set to zero, the CSU affinity factor is ignored, and it may behave as the CSU-based solution; If the threshold is set to ∞, the CSU time order factor is ignored, and it may behaved as the owner-based solution.

It should be appreciated the above CSU scheduling is merely described by way of example, it may not be necessary to execute all the steps or in the order described above, meanwhile other suitable implementations may also be applied to the embodiments.

As indicated, through introducing the global CSU list and owner waiting list, both the CSU time order and the CSU affinity can be taken into account in the CSU scheduling used by the radio communication device in a uniform way. In this way, the CSUs can be scheduled more reasonably. In addition, the embodiments may not require the linear search in each CSU scheduling.

In addition, usually all the CSUs waiting to be processed will be accommodated in the global CSU list, nevertheless it may be regulated that, when the CSUs belonging to the same owner are directly adjacent in the ordered global CSU list, the CSUs other than the CSU having the minimum time stamp (i.e. the earliest CSU) among the CSUs belonging to the same owner are unlinked from the global CSU list, but theses unlinked CSUs may still be maintained in this owner's sibling CSU list. For example, as shown in FIG. 8, the owner 1 owns CSU 11, CSU 12 and CSU 13. Originally, the three CSUs are listed in the global CSU list, and the CSU 12 is listed directly behind the CSU 11 (there is no other CSU between them). In this case, the CSU 12 can be unlinked from the global CSU list as illustrated in FIG. 8. Here, the CSU 12 is positioned directly behind the CSU 11, which means that, after the CSU 11 is processed, the CSU 12 will be inevitably processed next, since the CSU 12 owns both the closest affinity and the top time order. Therefore, this CSU may not be necessarily maintained in the global CSU list, thereby the length of the global CSU list can be cut down, which may reduce the cost on operating the global CSU list, such as traversing the global CSU list.

Now, the process of inserting the owner yielding the processor back to the owner waiting list will be discussed. Taking an example with reference to FIG. 8, provided that the owner 2 is the owner yielding the processor, and it will be inserted back to the owner waiting list, as such, the radio communication device may go through the global CSU list to locate it earliest CSU in the global CSU list. As shown in FIG. 8, CSU 22 is such earliest CSU under the owner 2, and the CSU 22 is positioned behind the CSU 11, but prior to the CSU 41, where the CSU 11 is the earliest CSU of wait owner 1 and the CSU 41 is the earliest CSU of the waiting owner 4. Consequently, it can be determined that the owner 2 is be inserted between the owner 1 and the owner 4 in the owner waiting list.

Figure 5:
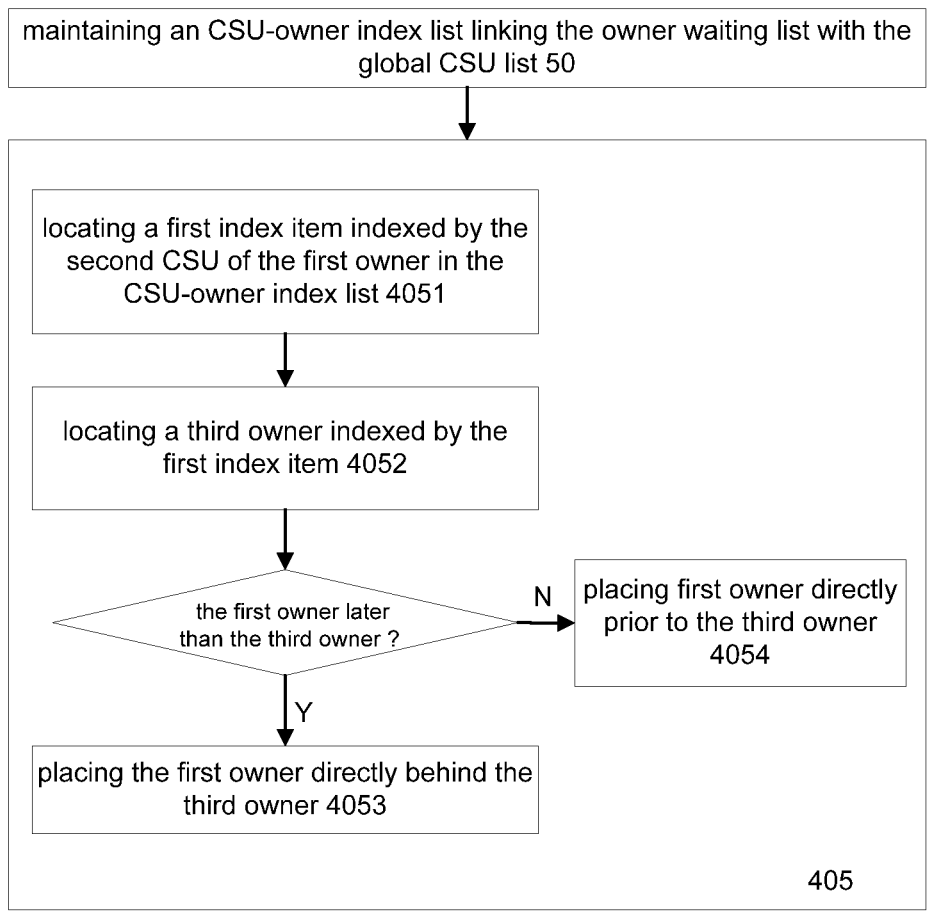
FIG. 5 schematically illustrates a flowchart of inserting an owner back to an owner waiting list in accordance with the another embodiment.

In the above embodiment, in order to insert an owner into the owner waiting list, the linear search of the global CSU list is required, which may cause the inefficient insertion. In another embodiment, a CSU-owner index list is introduced to avoid the linear search in the course of owner insertion. This embodiment will be described with reference to FIG. 5 and FIG. 9.

Figure 9:
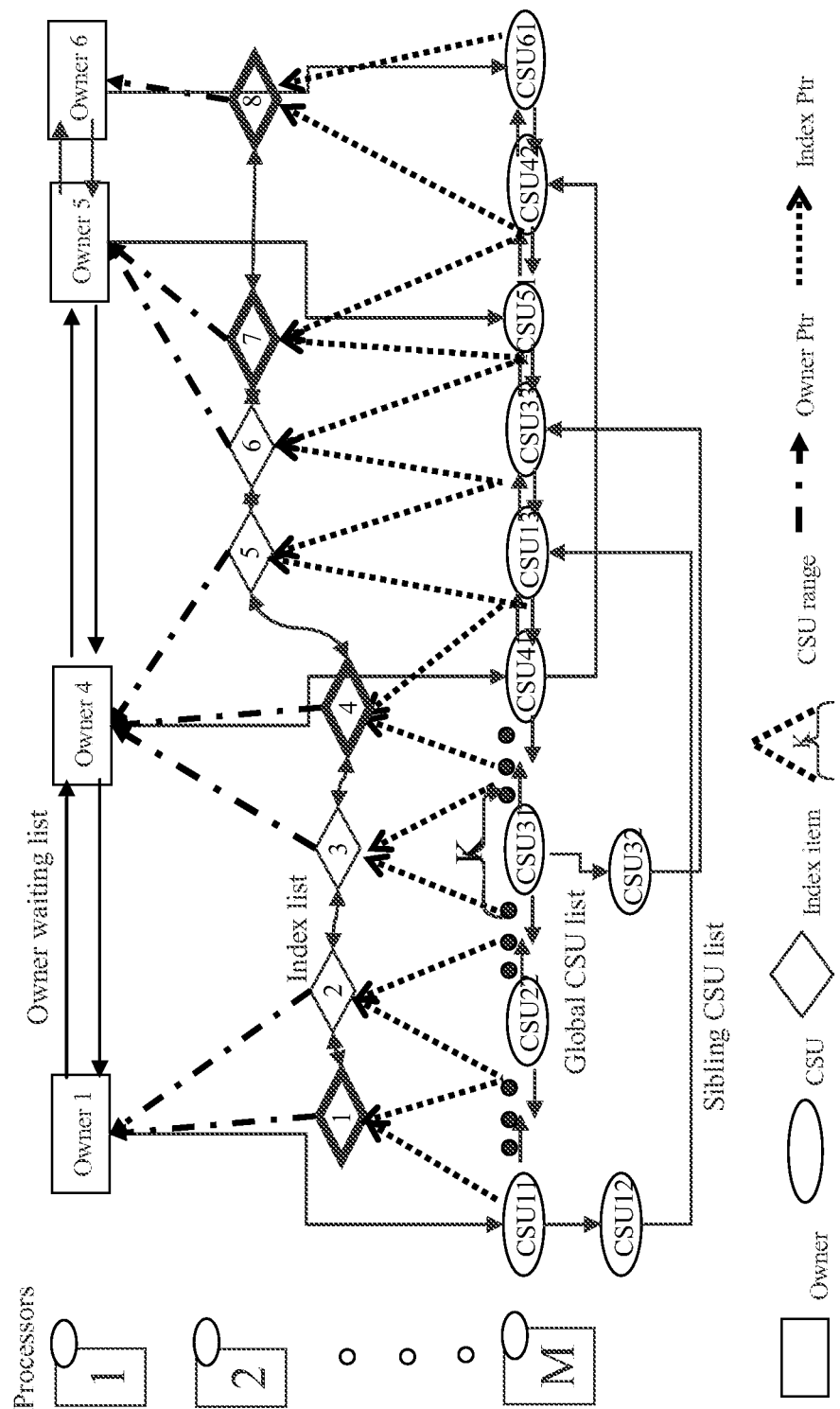
FIG. 9 schematically illustrates an example structure of the CSU-owner index list in accordance with the another embodiment.

In the embodiment, the radio communication device may maintain a CSU-owner index list linking the owner waiting list with the global CSU list. As illustrated in FIG. 9, the individual index items in the CSU-owner index list are sequentially indexed by respective consecutive ranges of CSUs in the global CSU list, in terms of CSU order in the global CSU list. Specifically, if a particular CSU in the global CSU list indexes an particular index item in the CSU-owner index list, then the CSUs listed behind the particular CSU in the global CSU list only can index the particular index item or the index items listed behind this particular index item in the CSU-owner index list. In addition, in the global CSU list, all the CSUs index one, and only one, index item in the CSU-owner index list. For example, the index item 6 is indexed by the CSU 33, and the index 8 is indexed by both CSU 42 and CSU 61.

On the other hand, the individual index items sequentially index one or more consecutive owners in the owner waiting list, in terms of owner order in the owner waiting list. Specifically, if a particular index item in the CSU-owner index list indexes an particular owner in the owner waiting list, then the index items listed behind the particular index item in the CSU-owner index list only can index the particular owner or the owners listed behind this particular owner in the owner waiting list. In addition, one index item only index one, and only one, owner. For example, the owner 1 is indexed by the index items 1 and 2. The owner 4 is indexed by the index items 3, 4 and 5.

Furthermore, a particular owner and the CSU range including the particular owner's earliest CSU are indexed by the same index item. In particular, if one owner's earliest CSU in the global CSU list indexes an index item in the CSU-owner index list, then the index item needs to index this owner. For example, as illustrated in FIG. 9, the CSU 41 is the earliest CSU under the owner 4 in the global CSU list. Hence when CSU 41 indexes the index item 4, the index item 4 has to index the owner 4.

By making use of the CSU-owner index list, the inserting an owner back to the owner waiting list according to its earliest CSU's time stamp can be performed, for example, as below:

Firstly, the radio communication device may directly find the earliest CSU indexed by the owner A to be inserted, and then locate the index item indexed by this earliest CSU, in step 4501. Subsequently, the radio communication device may directly locate the owner B indexed by this index item, in step 4502. If the time stamp of the owner A's earliest CSU is later (or more) than that of the owner B's earliest CSU in the global CSU list, then the radio communication device may insert the owner A directly behind the owner B in the owner waiting list, in step 4503. Otherwise, the radio communication device may insert the owner A directly prior to the owner B, in step 4504.

For example, the owner 2 is going to be inserted back the owner waiting list. As shown in the FIG. 9, the CSU 22 is the earliest CSU under the owner 2 in the global CSU list, and the CSU 22 indexes the index item 2 in the CSU-owner index list, and the index item 2 further indexes the owner 1. As such, the radio communication device will compare the time stamp of the CSU 22 with the time stamp of CSU 11 which is the earliest CSU under the owner 1. As a result, the CSU 22 is later than the CSU 11, thus the owner 2 will be inserted directly behind the owner 1 in the owner waiting list.

As seen, through introducing the CSU-owner index list, the linear search is avoided in the owner insertion, accordingly the insertion efficiency is greatly improved to the time complexity O(1).

Figure 6:
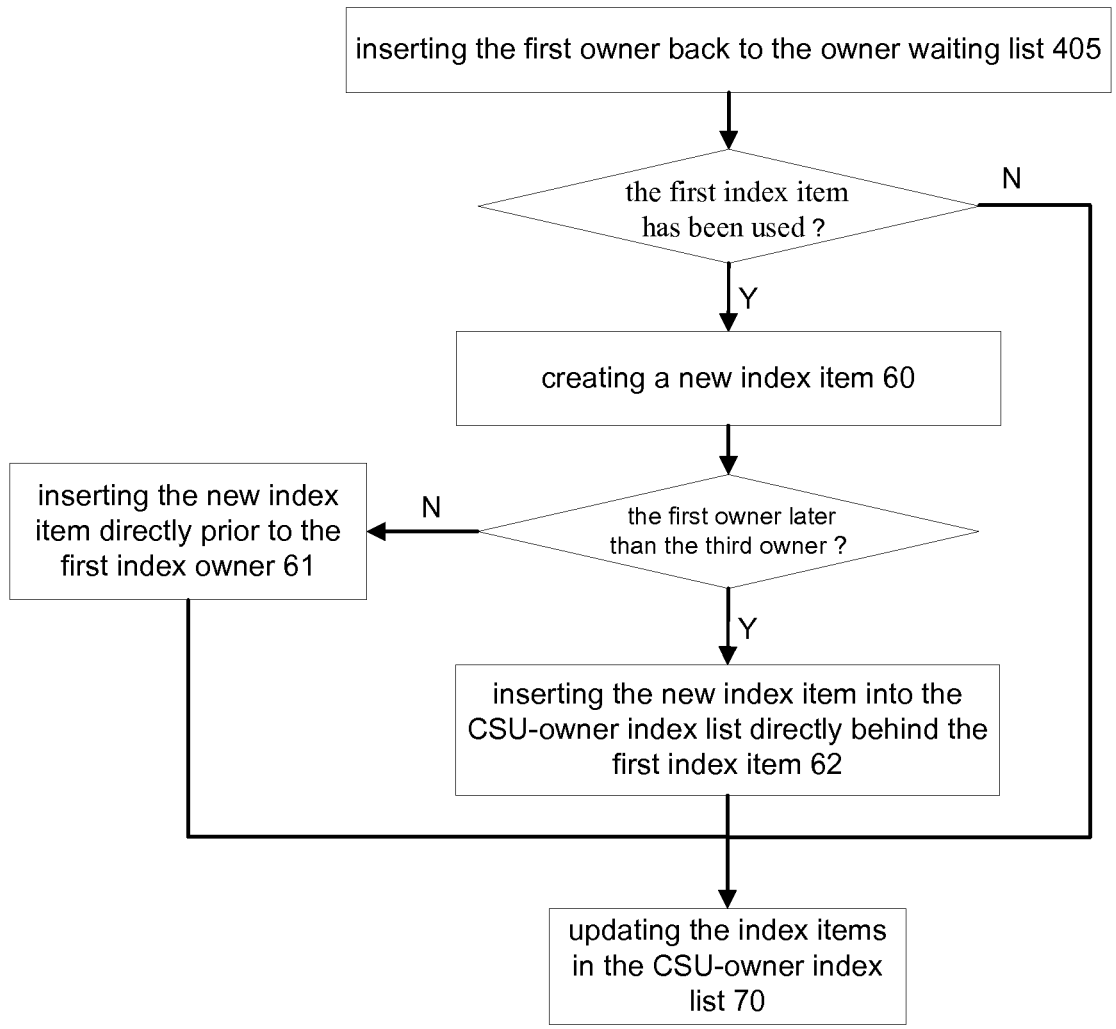
FIG. 6 schematically illustrates a flowchart of updating index items in an CSU-owner index list in accordance with the another embodiment.

Optionally, after inserting an owner back to the owner waiting list, the radio communication device may accordingly update the index items in the CSU-owner index list, according to the criteria of the index item indexing the owner. Specifically, an exemplary updating process will be described with reference to the FIG. 6 and FIG. 9.

After inserting the owner, e.g. owner 2, back to the owner waiting list, the radio communication device may determine whether the index item indexed by the inserted owner's earliest CSU, e.g. the index item 2 has been used to insert another owner back to the owner waiting list before like this, which may be suggested by a flag of this index item. If not, the radio communication device may update the relevant index items in CSU-owner index list, step 70. For example, the index item 2 may switch its owner indexing from the previous owner, e.g. owner 1, to the owner 2. Moreover, if any index items behind the index item 2 originally also index the owner 1, then these index items will also index the owner 2. Otherwise, for example, if index item 2 has been used to insert another owner back to the owner waiting list before like this, the radio communication device may firstly create a new index item, step 60. Subsequently, if the owner 2's earliest CSU, i.e. CSU 22 is later than the owner 1's earliest CSU, i.e. CSU 11, the radio communication device will insert (step 62) the new created index item directly behind the index item 2 in the CSU-owner index list, moreover if any CSUs behind the CSU 22 in the global CSU list also index the index item 2, then these CSUs shall switch the indexing from the index item 2 to the new created index. Or else, the radio communication device will insert (step 61) the new created index item directly prior to the index item 2, moreover, if any CSUs prior to the CSU 22 in the global CSU list also index the index item 2, then these CSUs shall switch the indexing from the index item 2 to the new created index. At this point, the radio communication device may accordingly update (step 70) the relevant index items in CSU-owner index list. Especially, for example, the new created index item will index the owner 2.

Alternatively, in order to improve the updating efficiency for the CSU-owner index list, the length of the CSU range indexing the same index item can be uniformly set to K, where K is a positive integer. In such a way, the index item number in the CSU-owner index list is about 1/K of that of CSUs in the global CSU list, accordingly by contrast with the case that the number of index items is equal to the number of the CSUs, the update efficiency is increased K times.

Moreover, the updating process can be further optimized by utilizing dichotomy, specifically the consecutive index items indexing one of two adjacent owners in the owner waiting list are divided two parts, the first half of index items index the former owner and the second half of index items index the latter owner node. For example, the index items 1-4 index two adjacent owners, owner 1 and owner 4. Preferably, the first half index items, i.e. the index items 1 and 2, will index the owner 1, and the second half index items, i.e. the index items 3 and 4 will index the owner 4. In this case, it can be known from the updating process described above that, when an index item in any half of the index items is used to insert an owner back to the owner waiting list, only this half of index items needs to be considered to update, and the other half of index items don't need to be updated at all, hence half of the update cost is saved.

Figure 7:
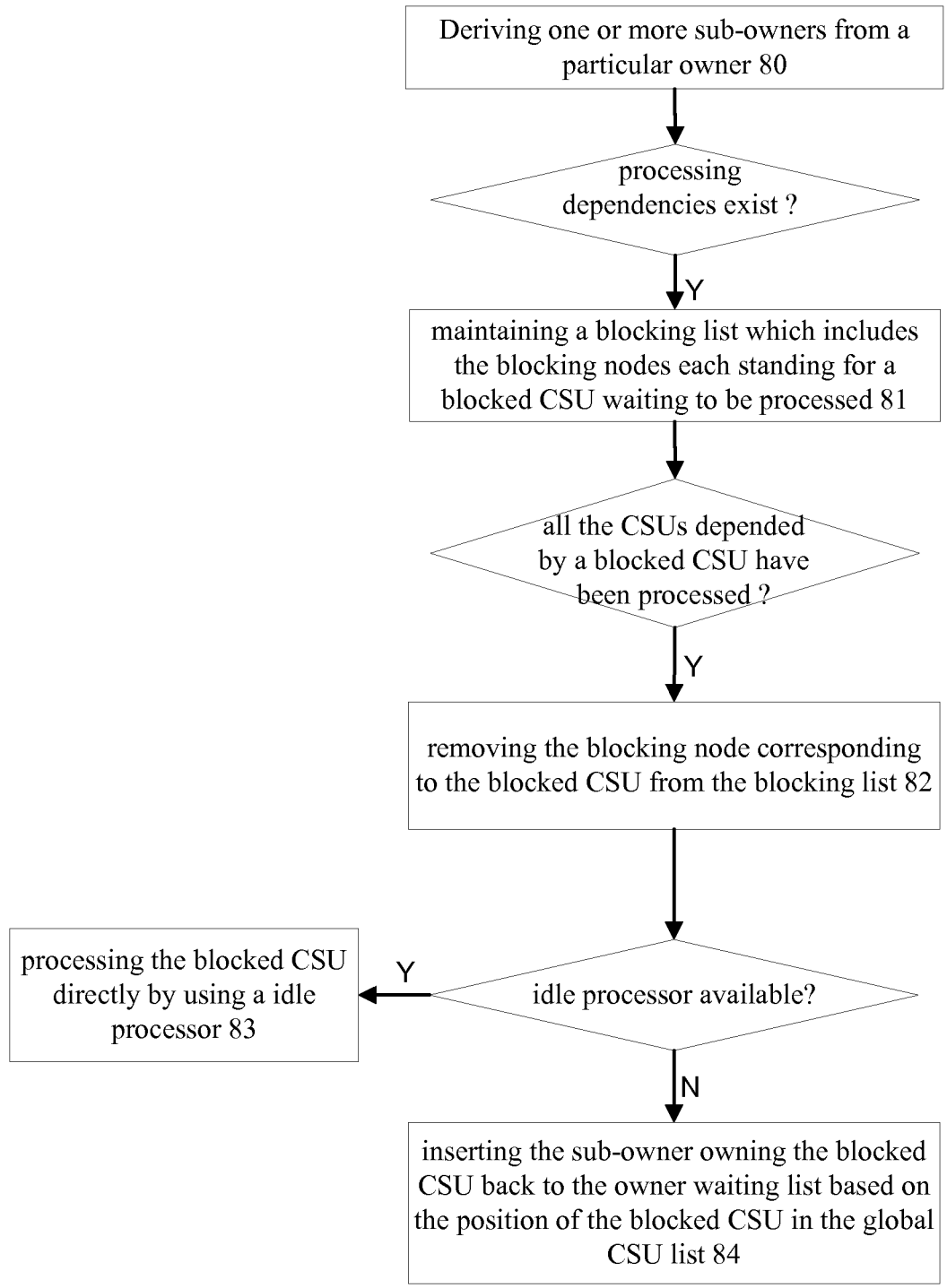
FIG. 7 schematically illustrates a flowchart of scheduling blocked CSUs so as to align the scheduling with these CSUs' time order, in accordance with the another embodiment.

In another embodiment, the method may further support concurrency processing among the CSUs under the same owner, which need divide an owner into several orthogonal "sub-owners" and the sub-owners will be handled as if an normal owner. As such, it is inevitably that there may be the non-orthogonal CSUs among the sub-owners, in other words, there are processing dependencies among the CSUs belonging to the different sub-owners, since the CSUs belonging to the different sub-owners may access the same part of the data context. Whereas before the processing dependencies only present among the CSUs under the same owner. In order to support the concurrency processing among the CSUs under the same owner and meanwhile ensure that the non-orthogonal CSUs can be processed in the right order, a blocking list is introduced in the course of CSU scheduling. Now the embodiment supporting the concurrency processing among the CSUs under the same owner will be described with reference to FIG. 7, FIG. 10 and FIG. 11.

Figure 10:
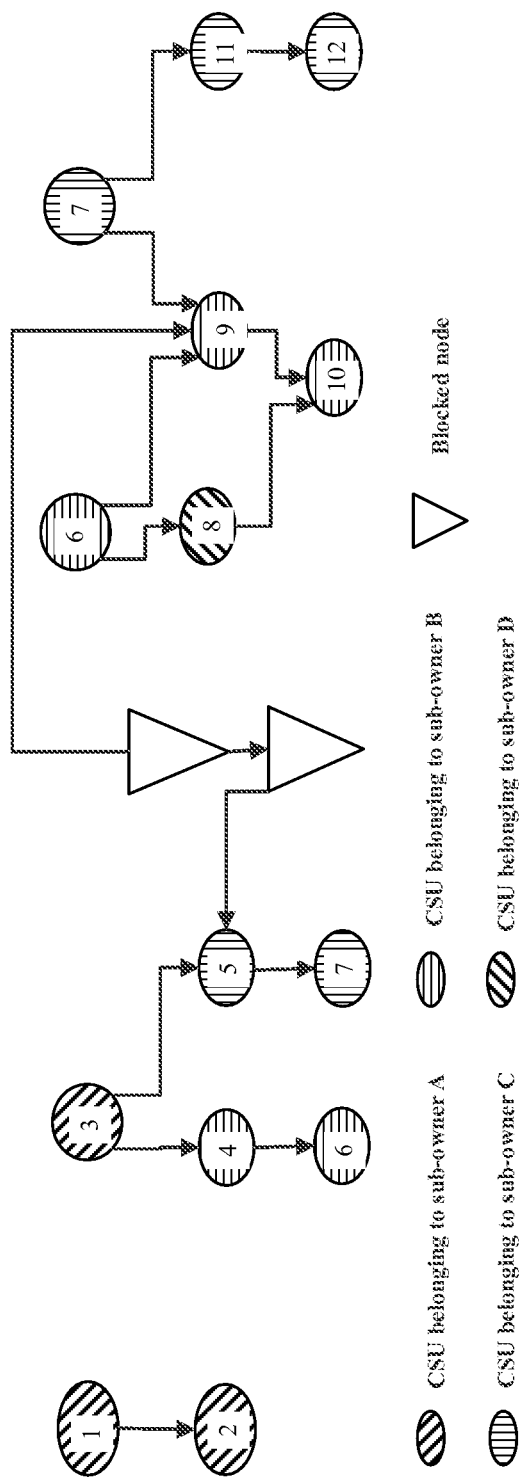
FIG. 10 schematically illustrates the processing dependencies among the CSUs under different sub-owners in accordance with the another embodiment.

Firstly, the radio communication device may derive (step 80) one or more sub-owners from a particular owner, wherein each sub-owner owns different parts of CSUs originally belonging to the particular owner. Generally, the CSUs accessing the same part of data context will be assigned to the same sub-owner as can as possible. Alternatively, the CSUs that may access multiple parts of data context being accessed by different CSUs under different sub-owners can be assigned to a separate sub-owner. As such, at least a part of the CSUs belonging to different sub-owners may be processed in parallel. As illustrated in FIG. 10, for example, the twelve CSUs under a particular owner are assigned to four divided sub-owners respectively, where the CSUs 1, 2 and 3 are under the sub-owner A, the CSUs 4, 6, 9 and 10 are under the sub-owner B, the CSUs 5, 7, 11 and 12 are under the sub-owner C and the CSU 8 is under the sub-owner D.

After deriving the sub-owners, the radio communication device may check these sub-owners' CSUs to determine if there are processing dependencies among the CSUs belonging to the different sub-owners. Again as illustrated in FIG. 10, for example, the CSU 4 under the sub-owner B and the CSU 5 under the sub-owner C have the processing dependency on the CSU 3 under the sub-owner A. For another, the CSU 8 under the sub-owner D has dependency on the CSU 6 under the sub-owner B.

In order to handling such processing dependencies, the radio communication device may maintain (step 81) a blocking list which includes the blocking nodes, each of which stands for a blocked CSU waiting to be processed. And the blocking nodes are sorted according to the time stamp of the corresponding blocked CSUs, for example in ascending order. Generally, if a CSU has processing dependency on another CSU under the owner different from that of this CSU, then this CSU may be taken as a blocked CSU and a corresponding blocking node is created to in the blocking list to represent this CSU, for example point to this CSU. Alternatively, in order to create the blocking node as few as possible in the blocking list to improve the execution efficiency, it may be regulated that, when a plurality of CSUs belonging to different sub-owner have processing dependency on a same predecessor CSU, only the CSUs other than that having the minimum time stamp (i.e. the earliest CSU) among the plurality of CSUs can be taken as the blocked CSUs, accordingly the radio communication device may just create blocking node for these blocked CSUs. According to the CSU scheduling mechanism described above, after a predecessor CSU is processed, its immediate successor, i.e. the earliest CSU among those depending on the predecessor CSU, will be processed immediately next. Thus, this CSU is not necessarily taken as a blocked CSU. For example, as shown in FIG. 10, both the CSU 4 under the sub-owner B and the CSU 5 under the sub-owner C have the processing dependency on the CSU 3 under the sub-owner A, and the time stamp of CSU 4 is earlier (or less) than the time stamp of CSU 5. In this case, the radio communication device may take the CSU 5 as a blocked CSU and create a blocking node for it, while the CSU 4 is not taken as a blocked CSU anymore.

Figure 11:
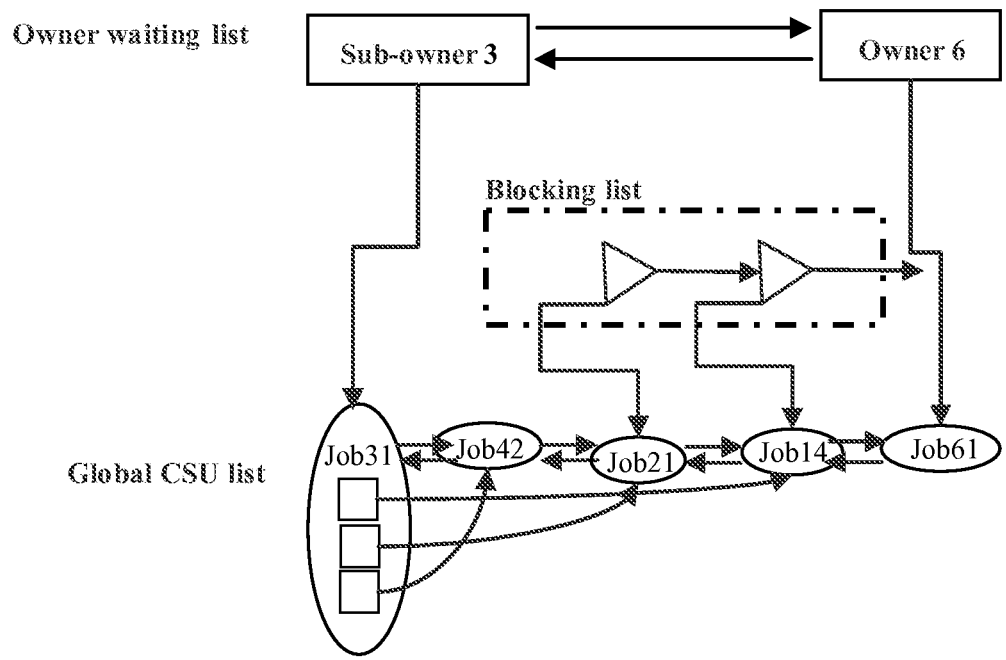
FIG. 11 schematically illustrates an example of the blocking list in combination with the global CSU list and the owner waiting list in accordance with the another embodiment.

Subsequently, whenever a processor finishes processing a CSU, the radio communication device may check the blocked CSUs to determine if all the predecessor CSUs on which a blocked CSU has processing dependency have been processed. If so, the radio communication device may remove (step 82) the blocking node corresponding to the blocked CSU from the blocking list. For example, as illustrated in FIG. 11, the CSU 42 under the sub-owner 4, the CSU 21 under the sub-owner 2 and the CSU 14 under the sub-owner 1 all have processing dependency on the CSU 31 under the sub-owner 3. As mentioned before, in this case, the earliest CSU, i.e. CSU 42, will not be taken as a blocked CSU, whereas the CSU 21 an the CSU 14 will be taken as the blocked CSUs and there are corresponding blocking nodes pointing to them. When the CSU 31 has been processed by a processor, the radio communication device may check the blocked CSUs and determine that all the predecessor CSUs that CSU 21 has processing dependency on have been processed (i.e. the CSU 31 is its last processed predecessor CSU), and that there still exists other predecessor CSUs that CSU 14 has processing dependency on are not processed till now. Based on the determination, the radio communication device will remove the blocking node pointing to the CSU 21 from the blocking list, while leaving the blocking node pointing to the CSU 14 alone.

Once a blocked CSU is unlinked with the corresponding blocking node in the blocking list and is ready to be processed, the radio communication device may need to determine if there is idle processor idle available. If available, the radio communication device may directly instruct the idle processor to directly process this blocked CSU (step 83). Otherwise, the radio communication device may find the sub-owner of the blocked CSU, and insert (step 84) this sub-owner back to the owner waiting list according to the position of the blocked CSU in the global CSU list, as described above. In this case, this blocked CSU will be processed later in accordance with the CSU scheduling mechanism discussed above.

By introducing the blocking list, the embodiment not only can manage those blocked CSUs, but also keep those blocked CSUs' original time order. Once these blocked CSUs become ready for scheduling, their owners can be inserted into owner waiting list still according to their original time stamp, thereby the blocked CSU still can be scheduled in consideration of its time stamp, which the most commercial OS even can't achieve. In the common commercial OS, the CSU scheduling mechanism always appends the unblocked CSU at end of all other ready CSUs, which causes that the time stamp of the unblocked CSU will not be considered any more in scheduling this CSU.

Figure 12:
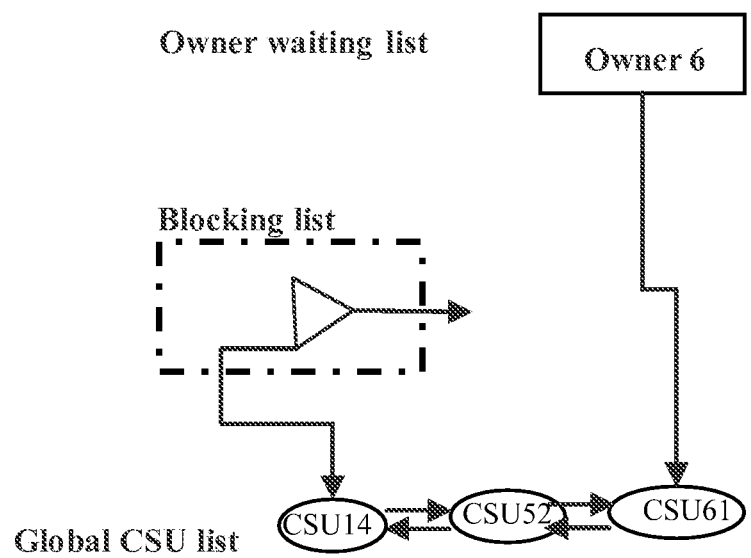
FIG. 12 schematically illustrates another example of the blocking list in combination with the global CSU list and the owner waiting list in accordance with the another embodiment.

Alternatively, when a particular CSU listed within the global CSU list will be processed, the CSU's unlinking from the global CSU list can be performed as appropriate, such as in serial or not. To this end, the radio communication device may firstly determine whether the unlinking operation needs to be executed serially. Specifically, the radio communication device may obtain a first time stamp of the earliest CSU waiting to be processed of the head owner in the owner waiting list and a second time stamp of the head blocked CSU with the minimum time stamp among all the blocked CSUs in the blocking list; then the radio communication device may compare the time stamp of the CSU to be processed with both the first time stamp and the second time stamp. When the time stamp of the CSU to be processed is more (or later) than either the first time stamp or the second time stamp, it is determined that the unlink operation should be performed in a serial manner so as to keep the time order of both the blocked CSUs and the ready scheduling CSUs in the global CSU list, otherwise the unlink operation is unnecessary, since the earlier time stamp of the CSU ready for scheduling than those of both head CSUs in the global CSU list and block list means the CSU ready for scheduling has already be put out of the global list. For example, as illustrated in FIG. 12, CSU 14 is the head blocked CSU and the CSU 61 is the earlier CSU under the header owner 6. When the CSU 52 listed in the global CSU list is scheduled to be processed, the radio communication device may be triggered to compare the time stamp of CSU 52 with the time stamps of the CSU 14 and CSU 61, and determine that the CSU 52 is later than the CSU 14, but earlier than the CSU 61. Therefore, the unlinking operation with respect to the CSU 52 is needed, and the radio communication device may unlink the CSU 52 from the global CSU list and link the CSU 14 with the CSU 61 serially, for example by imposing the semaphore on the global CSU list during the unlinking operation.

As known to the art, the serial operation may downgrade the execution efficiency, while the embodiment is capable of minimizing the serial unlinking operation without losing the record of the time order of both the blocked CSUs and the ready scheduling CSUs in the global CSU list.

Figure 13:
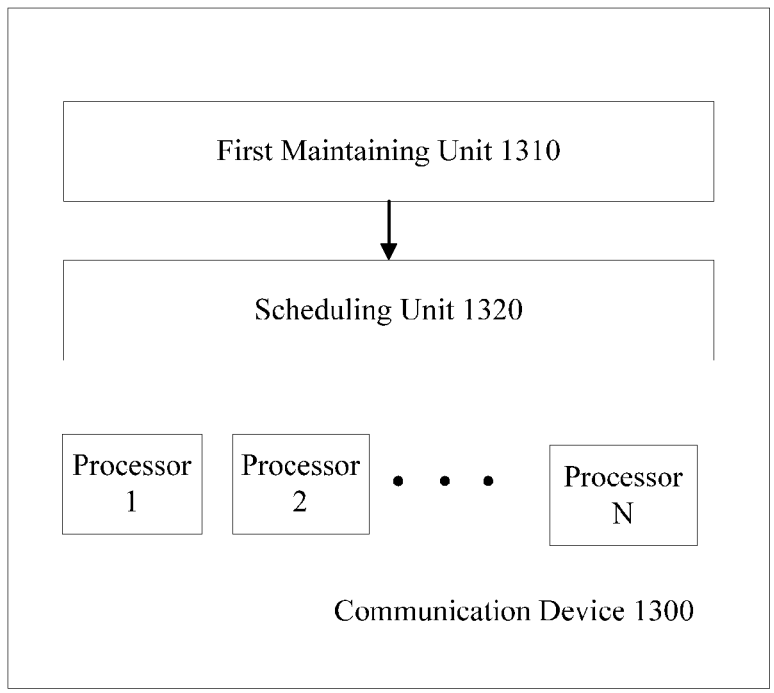
FIG. 13 is the block diagram of the radio communication device used to schedule CSUs in accordance with an embodiment.

FIG. 13 is the block diagram of the radio communication device comprising multiple processors, which schedules CSUs in accordance with an embodiment. As illustrated in FIG. 13, the radio communication device 1300 comprises processors 1 to N, a first maintaining unit 1310 and a scheduling unit 1320. Herein, the radio communication device may refer to, not limited to, base station, femto base station, NodeB, e-NodeB, access point (AP), etc. Further, this radio communication device may be adapted to various existing communication protocols/standards, such as Time Division Synchronous Code Division Multiple Access (TD-SCDMA), Wireless Fidelity (WiFi), Bluetooth, Universal Mobile Telecommunications System (UMTS), Worldwide Interoperability for Microwave Access (WiMAX), Code Division Multiple Access (CDMA), Wideband Code Division Multiple Access High Speed Packet Access (WCDMA-HSPA), Long Term Evolution (LTE) etc., and communication protocols/standards developed in the future. Now the functions of the individual units will be described in detail with reference to the FIG. 13.

The first maintaining unit 1310 in the radio communication device 1300 may maintain a global CSU list and an owner waiting list.

The global CSU list includes the CSUs waiting to be processed. In the global CSU list, the CSUs are ordered according to the time stamps of the CSUs. Generally, the timestamp is a sequence of characters or encoded information identifying when a certain event occurred, usually giving date and time of day, sometimes accurate to a small fraction of a second. Herein, the time stamp of the CSU may represent the time when the CSU is created or the time when the CSU joins in the global CSU list.

The owner waiting list includes the owners that have no CSU being processed by the processors. In other words, the owners that have one or more CSUs to be processed by the processors will be removed from the owner waiting list. In the owner waiting list, the owners are ordered according to the time stamps of their respective earliest CSUs (i.e. the CSU with the minimum time stamp) waiting to be processed in the global CSU list.

When a processor finishes processing a CSU under an owner, the scheduling unit 1320 may schedule a CSU to be processed next by the processor according to the CSU time order and the CSU affinity, based on the global CSU list and the owner waiting list.

The CSU time order can be determined by the time stamp of the CSU. For example, if the time stamp of the CSU A is earlier than the time stamp of CSU B, then the CSU A is sorted prior to the CSU B in the global CSU list. The CSU affinity means that one CSU has affinity with a processor which already has cached the necessary code or data this CSU need As mentioned above, the CSUs under the same owner may access the same part of context. In this case, if a processor just finishes processing the CSU A, then in view of the CSU affinity, it is desirable for the processor to process another CSU B under the same owner as the previous CSU A, since the data context accessed by the CSU B has been stored in the cache memory due to processing the CSU A just now. In this way, it does not have to perform the data context switch. However, in the opposite situation, if the processor is to process another CSU C under the different owner from the CSU A, then it is needed to flush the data context used by the CSU A from the cache memory, and then read the data context used by the CSU C into the cache memory.

Subsequently, an exemplary implementation will be described with reference to the FIG. 8.

When a processor just finished processing a CSU under an owner, the scheduling unit 1320 may try to obtain the another CSU has the minimum time stamp among the CSUs waiting to be processed that belong to this owner, i.e. the earliest CSU. In an embodiment, this owner may points to all its CSUs waiting to be processed. As such, the scheduling unit 1320 may locate all the CSUs through this owner, and compare the time stamps among them to determine the CSU with the minimum time stamp. In another embodiment, a sibling CSU list is maintained to accommodate all the CSUs waiting to be processed under this owner, and this owner may refer to the head of the sibling CSU list. For example, as shown in FIG. 8, the owner 4 has CSU 41 and CSU 42. The two CSUs are linked together in a sibling CSU list and the owner 4 points to the head of the sibling list, i.e. the CSU 41. Preferably, the CSUs are listed in ascending order in the sibling CSU list according to their time stamp. In other words, the CSU with minimum time stamp will be the head of the sibling CSU list. In this way, the scheduling unit 1320 will locate the head CSU in the sibling CSU list referred by this owner. As seen, this head CSU has affinity with the CSU just processed, since they belong to the same owner.

Subsequently, the scheduling unit 1320 may locate directly a head owner from the ordered owner waiting list. The head owner's earliest CSU waiting to be processed has the minimum time stamp among the owners in the owner waiting list. For example, as illustrated in FIG. 8, in the owner waiting list, there are four members, owner 1, owner 4, owner 5 and owner 6. And the four owners are listed in ascending order in the owner waiting list according to the time stamps their earliest CSUs waiting to be processed. That is, the owner having the minimum CSU time stamp will be listed in the head of the owner waiting list. Therefore, the scheduling unit 1320 may directly locate this head owner, e.g. CSU 11, in the owner waiting list.

Next, the scheduling unit 1320 may locate the earliest CSU waiting to be processed under the head owner located previously, in the global CSU list. Typically, the owners in the owner waiting list may refer to their earliest CSU in the global CSU list. For example, as shown in FIG. 8, the owner 1 refers to it earliest CSU in the global CSU list, CSU 11; the owner 4 refers to the CSU 41; the owner 5 refers to the CSU 51, and the like. In this way, the scheduling unit 1320 may also directly locate the intended CSU in the global CSU list. As mentioned above, only the owner having no CSU being processed are listed in the owner wait list, in other words, the owners not being listed in the owner waiting list may have acquired the processor resources. Thus, the located head owner should be the owner with the highest priority to acquire the processor resources; accordingly, the CSU located just now should be the candidate CSU with the top time order to be processed.

Then, the scheduling unit 1320 may compare the time stamp of the CSU with closest affinity with the time stamp of the CSU with the top time order and calculate the disparity between the two time stamps.

If the time stamp of the CSU with closest affinity is later (or more) than the time stamp of the CSU with the top time order, and the disparity exceeds a predetermined threshold, i.e. time interval, then it means that the CSU with the top time order takes precedence of the CSU with closest affinity, thereby the owner having the CSU with closest affinity has to yield the processor, and the owner having the CSU with the top time order will acquire the processor. In this case, the scheduling unit 1320 may take the following actions:

Firstly, the scheduling unit 1320 may insert the owner yielding the processor back to the owner waiting list, and the owner's position in the owner waiting list can be determined by the time stamp of its earliest CSU being listed in the global CSU list. The detailed insertion implementation will be described later. Next, the scheduling unit 1320 may remove the owner acquiring the processor from the owner waiting list. Finally, the scheduling unit 1320 may instruct the processor to process the CSU with the top time order.

On the other hand, if the time stamp of the CSU with closest affinity is earlier (or less) than the time stamp of the CSU with the top time order, or else the disparity is below the predetermined threshold, then it means that the CSU with closest affinity takes precedence of the CSU with the top time order. As such, the scheduling unit 1320 may instruct the processor to proceed with the CSU with the closest affinity, i.e. the next sibling CSU of the CSU just processed.

In the embodiment, the predetermined threshold can be adjusted as desired. Actually if the threshold is set to zero, the CSU affinity factor is ignored, and it may behave as the CSU-based solution; If the threshold is set to ∞, the CSU time order factor is ignored, and it may behaved as the owner-based solution.

As indicated, through introducing the global CSU list and owner waiting list, both the CSU time order and the CSU affinity can be taken into account in the CSU scheduling used by the radio communication device in a uniform way. In this way, the CSUs can be scheduled more reasonably. In addition, the embodiments may not require the linear search in each CSU scheduling.

In addition, usually all the CSUs waiting to be processed will be accommodated in the global CSU list, nevertheless, when the CSUs belonging to the same owner are directly adjacent in the ordered global CSU list, the first unlinking unit can unlink the CSUs other than the CSU having the minimum time stamp (i.e. the earliest CSU) among the CSUs belonging to the same owner from the global CSU list, but theses unlinked CSUs may still be maintained in this owner's sibling CSU list. For example, as shown in FIG. 8, the owner 1 owns CSU 11, CSU 12 and CSU 13. Originally, the three CSUs are listed in the global CSU list, and the CSU 12 is listed directly behind the CSU 11 (there is no other CSU between them). In this case, the CSU 12 can be unlinked from the global CSU list as illustrated in FIG. 8. Here, the CSU 12 is positioned directly behind the CSU 11, which means that, after the CSU 11 is processed, the CSU 12 will be inevitably processed next, since the CSU 12 owns both the closest affinity and the top time order. Therefore, this CSU may not be necessarily maintained in the global CSU list, thereby the length of the global CSU list can be cut down, which may reduce the cost on operating the global CSU list, such as traversing the global CSU list.

Now, the scheduling unit 1320 inserting the owner yielding the processor back to the owner waiting list will be discussed. Taking an example with reference to FIG. 8, provided that the owner 2 is the owner yielding the processor, and it will be inserted back to the owner waiting list, as such, the scheduling unit 1320 may go through the global CSU list to locate it earliest CSU in the global CSU list. As shown in FIG. 8, CSU 22 is such earliest CSU under the owner 2, and the CSU 22 is positioned behind the CSU 11, but prior to the CSU 41, where the CSU 11 is the earliest CSU of wait owner 1 and the CSU 41 is the earliest CSU of the waiting owner 4. Consequently, it can be determined that the owner 2 is be inserted between the owner 1 and the owner 4 in the owner waiting list.

In the above embodiment, in order to insert an owner into the owner waiting list, the linear search of the global CSU list is required, which may cause the inefficient insertion. In another embodiment, a CSU-owner index list is introduced to avoid the linear search in the course of owner insertion. This embodiment will be described with reference to FIG. 9.

In the embodiment, the second maintaining unit (not shown) in the radio communication device 1300 may maintain a CSU-owner index list linking the owner waiting list with the global CSU list. As illustrated in FIG. 9, the individual index items in the CSU-owner index list are sequentially indexed by respective consecutive ranges of CSUs in the global CSU list, in terms of CSU order in the global CSU list. Specifically, if a particular CSU in the global CSU list indexes an particular index item in the CSU-owner index list, then the CSUs listed behind the particular CSU in the global CSU list only can index the particular index item or the index items listed behind this particular index item in the CSU-owner index list. In addition, in the global CSU list, all the CSUs index one, and only one, index item in the CSU-owner index list. For example, the index item 6 is indexed by the CSU 33, and the index 8 is indexed by both CSU 42 and CSU 61.

On the other hand, the individual index items sequentially index one or more consecutive owners in the owner waiting list, in terms of owner order in the owner waiting list. Specifically, if a particular index item in the CSU-owner index list indexes an particular owner in the owner waiting list, then the index items listed behind the particular index item in the CSU-owner index list only can index the particular owner or the owners listed behind this particular owner in the owner waiting list. In addition, one index item only index one, and only one, owner. For example, the owner 1 is indexed by the index items 1 and 2. The owner 4 is indexed by the index items 3, 4 and 5.

Furthermore, a particular owner and the CSU range including the particular owner's earliest CSU are indexed by the same index item. In particular, if one owner's earliest CSU in the global CSU list indexes an index item in the CSU-owner index list, then the index item needs to index this owner. For example, as illustrated in FIG. 9, the CSU 41 is the earliest CSU under the owner 4 in the global CSU list. Hence when CSU 41 indexes the index item 4, the index item 4 has to index the owner 4.

By making use of the CSU-owner index list, the inserting an owner back to the owner waiting list according to its earliest CSU's time stamp can be performed, for example, as below:

Firstly, the scheduling unit 1320 may directly find the earliest CSU indexed by the owner A to be inserted, and then locate the index item indexed by this earliest CSU. Subsequently, the scheduling unit 1320 may directly locate the owner B indexed by this index item. If the time stamp of the owner A's earliest CSU is later (or more) than that of the owner B's earliest CSU in the global CSU list, then the scheduling unit 1320 may insert the owner A directly behind the owner B in the owner waiting list. Otherwise, the scheduling unit 1320 may insert the owner A directly prior to the owner B.

For example, the owner 2 is going to be inserted back the owner waiting list. As shown in the FIG. 9, the CSU 22 is the earliest CSU under the owner 2 in the global CSU list, and the CSU 22 indexes the index item 2 in the CSU-owner index list, and the index item 2 further indexes the owner 1. As such, the scheduling unit 1320 will compare the time stamp of the CSU 22 with the time stamp of CSU 11 which is the earliest CSU under the owner 1. As a result, the CSU 22 is later than the CSU 11, thus the owner 2 will be inserted directly behind the owner 1 in the owner waiting list.

As seen, through introducing the CSU-owner index list, the linear search is avoided in the owner insertion, accordingly the insertion efficiency is greatly improved to the time complexity O(1).

Optionally, after the scheduling unit 1320 inserts an owner back to the owner waiting list, the updating unit (not shown) in the radio communication device 1300 may accordingly update the index items in the CSU-owner index list, according to the criteria of the index item indexing the owner. Specifically, the function of the updating unit will be described with reference to the FIG. 9.

After the scheduling unit 1320 inserts the owner, e.g. owner 2, back to the owner waiting list, the updating unit may determine whether the index item indexed by the inserted owner's earliest CSU, e.g. the index item 2 has been used to insert another owner back to the owner waiting list before like this, which may be suggested by a flag of this index item. If not, the updating unit may update the relevant index items in CSU-owner index list. For example, the index item 2 may switch its owner indexing from the previous owner, e.g. owner 1, to the owner 2. Moreover, if any index items behind the index item 2 originally also index the owner 1, then these index items will also index the owner 2. Otherwise, for example, if index item 2 has been used to insert another owner back to the owner waiting list before like this, the updating unit may firstly create a new index item. Subsequently, if the owner 2's earliest CSU, i.e. CSU 22 is later than the owner 1's earliest CSU, i.e. CSU 11, the updating unit will insert the new created index item directly behind the index item 2 in the CSU-owner index list, moreover if any CSUs behind the CSU 22 in the global CSU list also index the index item 2, then these CSUs shall switch the indexing from the index item 2 to the new created index. Or else, the updating unit will insert the new created index item directly prior to the index item 2, moreover, if any CSUs prior to the CSU 22 in the global CSU list also index the index item 2, then these CSUs shall switch the indexing from the index item 2 to the new created index. At this point, the updating unit may accordingly update the relevant index items in CSU-owner index list. Especially, for example, the new created index item will index the owner 2.

Alternatively, in order to improve the updating efficiency for the CSU-owner index list, the length of the CSU range indexing the same index item can be uniformly set to K, where K is a positive integer. In such a way, the index item number in the CSU-owner index list is about 1/K of that of CSUs in the global CSU list, accordingly by contrast with the case that the number of index items is equal to the number of the CSUs, the update efficiency is increased K times.

Moreover, the updating unit may further optimize the updating by utilizing dichotomy, specifically the consecutive index items indexing one of two adjacent owners in the owner waiting list are divided two parts, the first half of index items index the former owner and the second half of index items index the latter owner node. For example, the index items 1-4 index two adjacent owners, owner 1 and owner 4. Preferably, the first half index items, i.e. the index items 1 and 2, will index the owner 1, and the second half index items, i.e. the index items 3 and 4 will index the owner 4. In this case, it can be known that, when an index item in any half of the index items is used to insert an owner back to the owner waiting list, only this half of index items needs to be considered to update, and the other half of index items don't need to be updated at all, hence half of the update cost is saved.

In another embodiment, the radio communication device 1300 may further support concurrency processing among the CSUs under the same owner, which need divide an owner into several orthogonal "sub-owners" and the sub-owners will be handled as if an normal owner. As such, it is inevitably that there may be the non-orthogonal CSUs among the sub-owners, in other words, there are processing dependencies among the CSUs belonging to the different sub-owners, since the CSUs belonging to the different sub-owners may access the same part of the data context. Whereas before the processing dependencies only present among the CSUs under the same owner. In order to support the concurrency processing among the CSUs under the same owner and meanwhile ensure that the non-orthogonal CSUs can be processed in the right order, a blocking list is introduced in the course of CSU scheduling. Now the embodiment supporting the concurrency processing among the CSUs under the same owner will be described with reference to FIG. 10 and FIG. 11.

Firstly, the deriving unit (not shown) in the radio communication device 1300 may derive one or more sub-owners from a particular owner, wherein each sub-owner owns different parts of CSUs originally belonging to the particular owner. Generally, the CSUs accessing the same part of data context will be assigned to the same sub-owner as can as possible. Alternatively, the CSUs that may access multiple parts of data context being accessed by different CSUs under different sub-owners can be assigned to a separate sub-owner. As such, at least a part of the CSUs belonging to different sub-owners may be processed in parallel. As illustrated in FIG. 10, for example, the twelve CSUs under a particular owner are assigned to four divided sub-owners respectively, where the CSUs 1, 2 and 3 are under the sub-owner A, the CSUs 4, 6, 9 and 10 are under the sub-owner B, the CSUs 5, 7, 11 and 12 are under the sub-owner C and the CSU 8 is under the sub-owner D.

After the deriving unit derives the sub-owners, the blocking unit (not shown) in the radio communication device 1300 may check these sub-owners' CSUs to determine if there are processing dependencies among the CSUs belonging to the different sub-owners. Again as illustrated in FIG. 10, for example, the CSU 4 under the sub-owner B and the CSU 5 under the sub-owner C have the processing dependency on the CSU 3 under the sub-owner A. For another, the CSU 8 under the sub-owner D has dependency on the CSU 6 under the sub-owner B.

In order to handling such processing dependencies, the blocking unit may maintain a blocking list which includes the blocking nodes, each of which stands for a blocked CSU waiting to be processed. And the blocking nodes are sorted according to the time stamp of the corresponding blocked CSUs, for example in ascending order. Generally, if a CSU has processing dependency on another CSU under the owner different from that of this CSU, then this CSU may be taken as a blocked CSU and a corresponding blocking node is created to in the blocking list to represent this CSU, for example point to this CSU. Alternatively, in order to create the blocking node as few as possible in the blocking list to improve the execution efficiency, it may be regulated that, when a plurality of CSUs belonging to different sub-owner have processing dependency on a same predecessor CSU, only the CSUs other than that having the minimum time stamp (i.e. the earliest CSU) among the plurality of CSUs can be taken as the blocked CSUs, accordingly the blocking unit may just create blocking node for these blocked CSUs. According to the CSU scheduling mechanism described above, after a predecessor CSU is processed, its immediate successor, i.e. the earliest CSU among those depending on the predecessor CSU, will be processed immediately next. Thus, this CSU is not necessarily taken as a blocked CSU. For example, as shown in FIG. 10, both the CSU 4 under the sub-owner B and the CSU 5 under the sub-owner C have the processing dependency on the CSU 3 under the sub-owner A, and the time stamp of CSU 4 is earlier (or less) than the time stamp of CSU 5. In this case, the blocking unit may take the CSU 5 as a blocked CSU and create a blocking node for it, while the CSU 4 is not taken as a blocked CSU anymore.

Subsequently, whenever a processor finishes processing a CSU, the blocking unit may check the blocked CSUs to determine if all the processor CSUs on which a blocked CSU has processing dependency have been processed. If so, the blocking unit may remove the blocking node corresponding to the blocked CSU from the blocking list. For example, as illustrated in FIG. 11, the CSU 42 under the sub-owner 4, the CSU 21 under the sub-owner 2 and the CSU 14 under the sub-owner 1 all have processing dependency on the CSU 31 under the sub-owner 3. As mentioned before, in this case, the earliest CSU, i.e. CSU 42, will not be taken as a blocked CSU, whereas the CSU 21 an the CSU 14 will be taken as the blocked CSUs and there are corresponding blocking nodes pointing to them. When the CSU 31 has been processed by a processor, the blocking unit may check the blocked CSUs and determine that all the predecessor CSUs that CSU 21 has processing dependency on have been processed (i.e. the CSU 31 is its last processed predecessor CSU), and that there still exists other predecessor CSUs that CSU 14 has processing dependency on are not processed till now. Based on the determination, the blocking unit will remove the blocking node pointing to the CSU 21 from the blocking list, while leaving the blocking node pointing to the CSU 14 alone.

Once a blocked CSU is unlinked with the corresponding blocking node in the blocking list and is ready to be processed, the blocking unit may need to determine if there is idle processor idle available. If available, the blocking unit may directly instruct the idle processor to directly process this blocked CSU. Otherwise, the blocking unit may find the sub-owner of the blocked CSU, and insert this sub-owner back to the owner waiting list according to the position of the blocked CSU in the global CSU list, as the insertion performed by the scheduling unit 1320 above. In this case, this blocked CSU will be processed later in accordance with the CSU scheduling mechanism discussed above.

By introducing the blocking list, the embodiment not only can manage those blocked CSUs, but also keep those blocked CSUs' original time order. Once these blocked CSUs become ready for scheduling, their owners can be inserted into owner waiting list still according to their original time stamp, thereby the blocked CSU still can be scheduled in consideration of its time stamp, which the most commercial OS even can't achieve. In the common commercial OS, the CSU scheduling mechanism always appends the unblocked CSU at end of all other ready CSUs, which causes that the time stamp of the unblocked CSU will not be considered any more in scheduling this CSU.

Alternatively, when a particular CSU listed within the global CSU list will be processed, the CSU's unlinking from the global CSU list can be performed as appropriate, such as in serial or not. To this end, the second unlinking unit (not shown) in the radio communication device 1300 may firstly determine whether the unlinking operation is required to be executed serially. Specifically, the second unlinking unit may obtain a first time stamp of the earliest CSU waiting to be processed of the head owner in the owner waiting list and a second time stamp of the head blocked CSU with the minimum time stamp among all the blocked CSUs in the blocking list; then the second unlinking unit may compare the time stamp of the CSU to be processed with both the first time stamp and the second time stamp. When the time stamp of the CSU to be processed is more (or later) than either the first time stamp or the second time stamp, it is determined that the unlink operation should be performed in a serial manner so as to keep the time order of both the blocked CSUs and the ready scheduling CSUs in the global CSU list. For example, as illustrated in FIG. 12, CSU 14 is the head blocked CSU and the CSU 61 is the earlier CSU under the header owner 6. When the CSU 52 listed in the global CSU list is scheduled to be processed, the second unlinking unit may be triggered to compare the time stamp of CSU 52 with the time stamps of the CSU 14 and CSU 61, and determine that the CSU 52 is later than the CSU 14, but earlier than the CSU 61. Therefore, the unlinking operation with respect to the CSU 52 should be performed serially, and the second unlinking unit may unlink the CSU 52 from the global CSU list and link the CSU 14 with the CSU 61 serially, for example by imposing the semaphore on the global CSU list during the unlinking operation.

As known to the art, the serial operation may downgrade the execution efficiency, while the embodiment is capable of minimizing the serial unlinking operation without losing the record of the time order of both the blocked CSUs and the ready scheduling CSUs in the global CSU list.

Furthermore, a communication device using multiple processors is proposed, which may comprise the radio communication device, e.g. radio communication device 1300, so as to scheduling the CSUs in the real-time multiprocessing environment.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method of scheduling communication schedulable units, CSUs, belonging to different owners in a radio communication device using multiple processors, wherein the CSUs can be processed in parallel by at least two of the processors, comprising:
   maintaining a global CSU list and an owner waiting list, wherein the global CSU list includes CSUs waiting to be processed and in the global CSU list, the CSUs waiting to be processed are ordered according to time stamps of the CSUs waiting to be processed, wherein the owner waiting list includes owners that have no CSU being processed by the processors and in the owner waiting list the owners that have no CSU being processed are ordered according to time stamps of their respective earliest CSUs waiting to be processed in the global CSU list; and
   when one of the processors finishes processing a first CSU of a first owner, scheduling a CSU to be processed next by the processor according to the order of the CSUs by the time stamps and CSU affinity, based on the global CSU list and the owner waiting list,
   wherein the scheduling comprises:
      obtaining a second CSU waiting to be processed that belongs to the first owner, the second CSU has a minimum time stamp among the CSUs waiting to be processed that belong to the first owner;
      locating a head owner from the owner waiting list, the head owner's earliest CSU waiting to be processed has a minimum time stamp among the owners in the owner waiting list;
      locating a third CSU in the global CSU list which is the head owner's earliest CSU waiting to be processed;
      calculating a disparity between a first time stamp of the second CSU and a second time stamp of the third CSU; and
      when the disparity that the first time stamp is later than the second time stamp exceeds a predefined threshold, inserting the first owner back to the owner waiting list according to the first time stamp, removing the head owner from the owner waiting list and processing the third CSU of the head owner by the processor, otherwise processing the second CSU by the processor.

2. The method according to claim 1, wherein CSUs belonging to a same owner in the global CSU list are linked together.

3. The method according to claim 2, comprising:
   when the CSUs belonging to a same owner are directly adjacent in the global CSU list, unlinking CSUs other than the CSU having a minimum time stamp among the CSUs belonging to the same owner from the global CSU list.

4. The method according to claim 1, comprising maintaining a CSU-owner index list linking the owner waiting list with the global CSU list, wherein individual index items in the CSU-owner index list are sequentially indexed by respective consecutive ranges of CSUs in the global CSU list, in terms of CSU order in the global CSU list, and one CSU in the global CSU list only index one index item,
   wherein the individual index items sequentially index one or more consecutive owners in the owner waiting list, in terms of owner order in the owner waiting list, and one index item only index one of the owners in the owner waiting list,
   wherein a particular owner and the CSU range including the particular owner's earliest CSU are indexed by a same one of the index items; and
   wherein the inserting the first owner back to the owner waiting list according to the first time stamp comprises:
      locating directly a first index item indexed by the second CSU of the first owner in the CSU-owner index list, locating directly a third owner indexed by the first index item, placing the first owner directly behind the third owner in the owner waiting list if the time stamp of the first owner's earliest CSU waiting to be processed is later than that of the third owner's earliest CSU waiting to be processed; otherwise placing first owner directly prior to the third owner.

5. The method according to claim 4, wherein consecutive index items indexing one of two adjacent owners in the owner waiting list are divided into two parts, a first part of index items index a former of the two adjacent owners and a second part of index items index the latter of the two adjacent owners.

6. The method according to claim 4, wherein a length of a CSU range corresponding to each index item is uniformly set to K, which is a positive integer.

7. The method according to claim 4, the method comprises:
   after inserting the first owner back to the owner waiting list, updating the index items in the CSU-owner index list, wherein the first index item will index the first owner.

8. The method according to claim 7, wherein after inserting the first owner back to the owner waiting list, if the first index item has been used to insert another owner back to the owner waiting list before, creating a new index item and inserting the new index item into the CSU-owner index list directly behind the first index item if the time stamp of the first owner's earliest CSU waiting to be processed is later than that of the third owner's earliest CSU waiting to be processed; otherwise inserting the new created index item directly prior to the first index owner, then updating the index items in the CSU-owner index list, wherein the new index item will index the first owner.

9. A computer program product comprising a non-transitory computer readable storage medium storing instructions which when run on a radio communication device provided with multiple processors causes the radio communication device to perform the steps of the method according to claim 1.

10. A method of scheduling communication schedulable units, CSUs, belonging to different owners in a radio communication device using multiple processors, wherein the CSUs can be processed in parallel by at least two of the processors, comprising:
   maintaining a global CSU list and an owner waiting list, wherein the global CSU list includes CSUs waiting to be processed and in the global CSU list, the CSUs waiting to be processed are ordered according to time stamps of the CSUs waiting to be processed, wherein the owner waiting list includes owners that have no CSU being processed by the processors and in the owner waiting list the owners that have no CSU being processed are ordered according to time stamps of their respective earliest CSUs waiting to be processed in the global CSU list;

when one of the processors finishes processing a first CSU of a first owner, scheduling a CSU to be processed next by the processor according to the order of the CSUs by the time stamps and CSU affinity, based on the global CSU list and the owner waiting list;

deriving one or more sub-owners from a particular owner, wherein each sub-owner owns different parts of CSUs originally belonging to the particular owner, at least part of the CSUs belonging to different sub-owners can be processed in parallel; and if there are processing dependencies among the CSUs respectively belonging to the different sub-owners:

maintaining a blocking list which includes blocking nodes each standing for a blocked CSU waiting to be processed, the blocking nodes are ordered according to the time stamp of the corresponding blocked CSUs; and when all the CSUs on which a blocked CSU has processing dependency have been processed, removing the blocking node corresponding to the blocked CSU from the blocking list, and if there is no idle processor available among the multiple processors to process the blocked CSU, inserting the sub-owner owning the blocked CSU back to the owner waiting list based on the position of the blocked CSU in the global CSU list, otherwise processing the blocked CSU directly by using an idle processor.

11. The method according to claim 10, wherein when a plurality of CSUs belonging to different sub-owner have processing dependency on a same predecessor CSU, adding the CSUs other than that having a minimum time stamp among the plurality of CSUs into the blocking list as the blocked CSUs.

12. The method according to claim 10, the method comprises if a particular CSU which will be scheduled to be processed is linked within the global CSU list:

obtaining a third time stamp of the earliest CSU waiting to be processed of the head owner in the owner waiting list;

obtaining a fourth time stamp of ahead blocked CSU with the minimum time stamp among all the blocked CSUs in the blocking list;

comparing the time stamp of the particular CSU with the earlier one between the third time stamp and the fourth time stamp; and when the time stamp of the particular CSU is later than above said earlier time stamp, unlinking the particular CSU from the global CSU list in a serial manner.

13. A radio communication device having multiple processors and being adapted for scheduling communication schedulable units, CSUs, belonging to different owners wherein the CSUs can be processed in parallel by at least two of the processors, comprising:

a first maintaining unit adapted to maintain a global CSU list and an owner waiting list, wherein the global CSU list includes CSUs waiting to be processed and in the global CSU list, the CSUs waiting to be processed are ordered according to time stamps of the CSUs waiting to be processed, wherein the owner waiting list includes owners that have no CSU being processed by the processors and in the owner waiting list, the owners that have no CSU being processed are ordered according to time stamps of their respective earliest CSUs waiting to be processed in the global CSU list; and a scheduling unit adapted to, when one of the processors finishes processing a first CSU of a first owner, schedule a CSU to be processed next by the processor according to the order of the CSUs by the time stamps and CSU affinity, based on the global CSU list and the owner waiting list, and further adapted to:

obtain a second CSU waiting to be processed that belongs to the first owner, the second CSU has a minimum time stamp among the CSUs waiting to be processed that belong to the first owner;

locate a head owner from the owner waiting list, the head owner's earliest CSU waiting to be processed has a minimum time stamp among the owners in the owner waiting list;

locate a third CSU in the global CSU list which is the head owner's earliest CSU waiting to be processed;

calculate a disparity between a first time stamp of the second CSU and a second time stamp of the third CSU; and when the disparity that the first time stamp is later than the second time stamp exceeds a predefined threshold, insert the first owner back to the owner waiting list according to the first time stamp, remove the head owner from the owner waiting list and process the third CSU of the head owner by the processor, otherwise process the second CSU by the processor.

14. The radio communication device according to claim 13, wherein the CSUs belonging to a same owner in the global CSU list are linked together.

15. The radio communication device according to claim 14, comprising:

a first unlinking unit, when the CSUs belonging to a same owner are directly adjacent in the global CSU list, adapted to unlink CSUs other than the CSU having a minimum time stamp among the CSUs belonging to the same owner from the global CSU list.

16. The radio communication device according to claim 13, comprising:

a second maintaining unit adapted to maintain a CSU-owner index list linking the owner waiting list with the global CSU list, wherein individual index items in the CSU-owner index list are sequentially indexed by respective consecutive ranges of CSUs in the global CSU list, in terms of CSU order in the global CSU list, and one CSU in the global CSU list only index one index item, wherein the individual index items sequentially index one or more consecutive owners in the owner waiting list, in terms of owner order in the owner waiting list, and one index item only index one of the owners in the owner waiting list, wherein a particular owner and the CSU range including the particular owner's earliest CSU are indexed by a same one of the index items; and wherein the scheduling unit is adapted to insert the first owner back to the owner waiting list according to the first time stamp by locating directly a first index item indexed by the second CSU of the first owner in the CSU-owner index list, locating directly a third owner indexed by the first index item, placing the first owner directly behind the third owner in the owner waiting list if the time stamp of the first owner's earliest CSU waiting to be processed is later than that of the third owner 's earliest CSU waiting to be processed; otherwise placing first owner directly prior to the third owner.

17. The radio communication device according to claim 16, wherein the consecutive index items indexing one of two adjacent owners in the owner waiting list are divided into two parts, a first part of index items index a former of the two adjacent owners and a second part of index items index the latter of the two adjacent owners.

18. The radio communication device according to claim 16, wherein a length of a CSU range corresponding to each index item is uniformly set to K, which is a positive integer.

19. The radio communication device according to claim 16, comprising:
   an updating unit, after the first owner is inserted back to the owner waiting list, adapt to update the index items in the CSU-owner index list, wherein the first index item will index the first owner.

20. The radio communication device according to claim 19, wherein after the first owner is inserted back to the owner waiting list, if the first index item has been used to insert another owner back to the owner waiting list before, the updating unit is adapted to create a new index item and insert the new index item into the CSU-owner index list directly behind the first index item if the time stamp of the first owner's earliest CSU waiting to be processed is later than that of the third owner's earliest CSU waiting to be processed; otherwise insert the new created index item directly prior to the first index owner, and then update the index items in the CSU-owner index list, wherein the new index item will index the first owner.

21. A radio communication device having multiple processors and being adapted for scheduling communication schedulable units, CSUs, belonging to different owners wherein the CSUs can be processed in parallel by at least two of the processors, comprising:
   a first maintaining unit adapted to maintain a global CSU list and an owner waiting list, wherein the global CSU list includes CSUs waiting to be processed and in the global CSU list, the CSUs waiting to be processed are ordered according to time stamps of the CSUs waiting to be processed, wherein the owner waiting list includes owners that have no CSU being processed by the processors and in the owner waiting list, the owners that have no CSU being processed are ordered according to time stamps of their respective earliest CSUs waiting to be processed in the global CSU list;
   a scheduling unit adapted to, when one of the processors finishes processing a first CSU of a first owner, schedule a CSU to be processed next by the processor according to the order of the CSUs by the time stamps and CSU affinity, based on the global CSU list and the owner waiting list;
   a deriving unit adapted to derive one or more sub-owners from a particular owner, wherein each sub-owner owns different parts of CSUs originally belonging to the particular owner, at least part of the CSUs belonging to different sub-owners can be processed in parallel; and
   a blocking unit adapted to, if there are processing dependencies among the CSUs respectively belonging to the different sub-owners, perform the following:
   maintaining a blocking list which includes blocking nodes each standing for a blocked CSU waiting to be processed, the blocking nodes are ordered according to the time stamp of the corresponding blocked CSUs; and
   when all the CSUs on which a blocked CSU has processing dependency have been processed, removing the blocking node corresponding to the blocked CSU from the blocking list, and if there is no idle processor available among the multiple processors to process the blocked CSU, inserting the sub-owner owning the blocked CSU back to the owner waiting list based on the position of the blocked CSU in the global CSU list, otherwise processing the blocked CSU directly by using an idle processor.

22. The radio communication device according to claim 21, wherein blocking unit is adapted to, when a plurality of CSUs belonging to different sub-owner have processing dependency on a same predecessor CSU, add the CSUs other than that having a minimum time stamp among the plurality of CSUs into the blocking list as the blocked CSUs.

23. The radio communication device according to claim 21, comprising:
   a second unlinking unit adapted to, if a particular CSU which will be scheduled to be processed is linked within the global CSU list, perform the following:
   obtaining a third time stamp of the earliest CSU waiting to be processed of the head owner in the owner waiting list;
   obtaining a fourth time stamp of a head blocked CSU with the minimum time stamp among all the blocked CSUs in the blocking list;
   comparing the time stamp of the particular CSU with the earlier one between the third time stamp and the fourth time stamp; and
   when the time stamp of the particular CSU is later than above said earlier time stamp, unlinking the particular CSU from the global CSU list in a serial manner.

\* \* \* \* \*